United States Patent [19]

Pottorff et al.

[11] 4,279,330

[45] Jul. 21, 1981

[54] DOUBLE-ACTING DISC BRAKE

[75] Inventors: Donald R. Pottorff, Mercersburg, Pa.; Rene G. Galmiche, Hagerstown, Md.

[73] Assignee: Walter Kidde & Company, Inc., Clifton, N.J.

[21] Appl. No.: 810,511

[22] Filed: Jun. 27, 1977

[51] Int. Cl.³ .......................................... F16D 55/46
[52] U.S. Cl. .................................... 188/71.7; 188/170
[58] Field of Search .................. 188/71.5, 71.7, 72.3, 188/170, 196 M

[56] References Cited

U.S. PATENT DOCUMENTS

| | | | |
|---|---|---|---|
| 2,925,889 | 2/1960 | Albright | 188/71.5 X |
| 3,082,647 | 3/1963 | Banker | 188/170 X |
| 3,547,234 | 12/1970 | Cummins et al. | 188/170 |
| 3,680,666 | 8/1972 | Sommer | 188/170 |
| 3,863,038 | 1/1975 | Kreitner et al. | 188/170 |

*Primary Examiner*—Duane A. Reger
*Attorney, Agent, or Firm*—Brady, O'Boyle & Gates

[57] ABSTRACT

Normal operating fluid pressure is applied behind a brake release piston in a first pressure chamber in the brake assembly. Variable operator control fluid pressure is applied in a second chamber of the assembly behind a brake applying piston which opposes the brake release piston in the assembly. A dry chamber for stator and rotor discs of the brake lies between the two pistons with a skirt of the brake release piston surrounding the discs and engaging a pressure plate forming the endmost stator disc adjacent to the brake applying piston. Brake applying springs are intervened between the pressure plate and brake applying piston to impart to the disc brake a fail-safe capability as well as a brake "on" condition when the system is depressurized.

1 Claim, 2 Drawing Figures

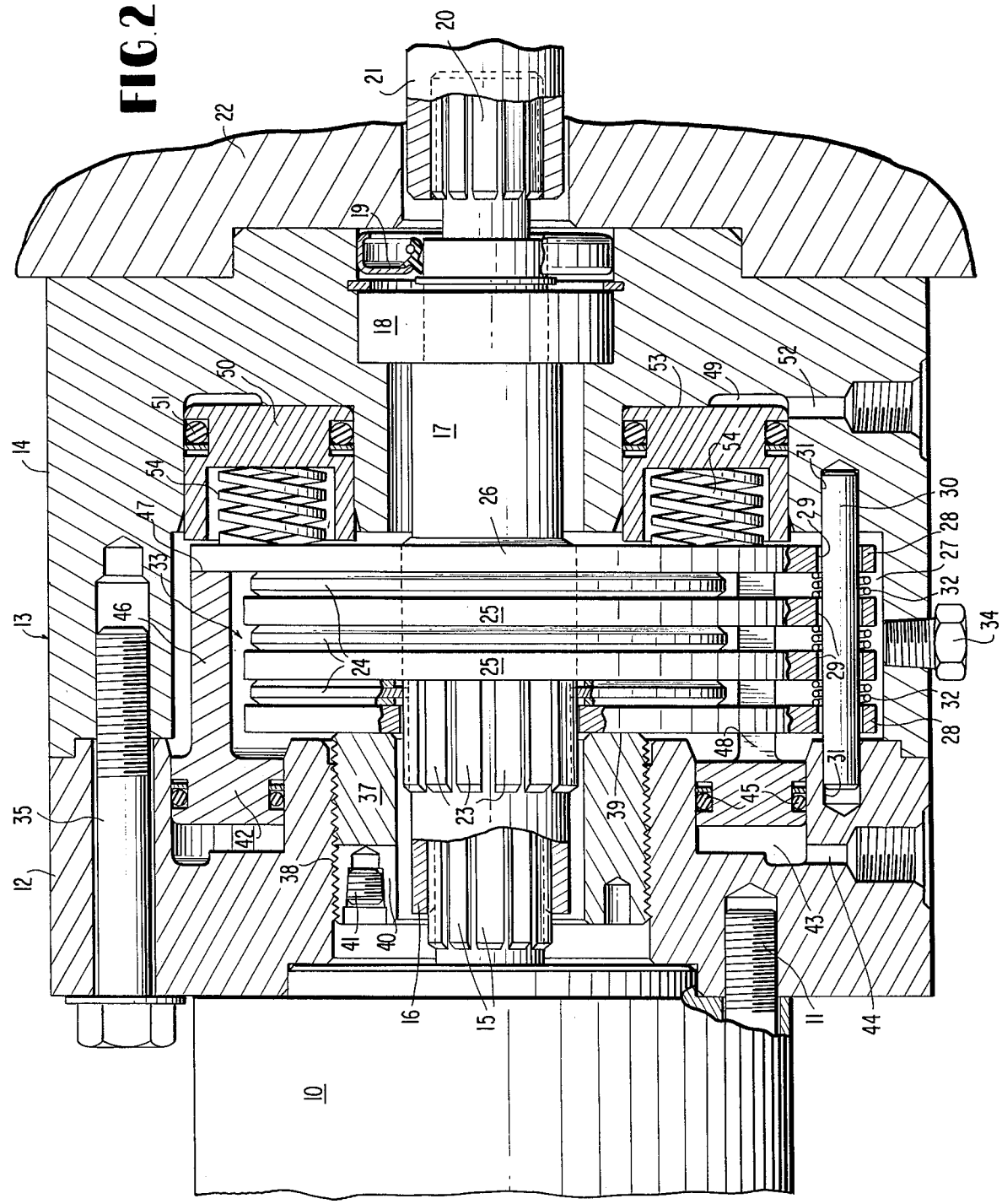

DOUBLE-ACTING DISC BRAKE

BACKGROUND OF THE INVENTION

The invention is an improvement on the class of disc brakes exemplified by U.S. Pat. No. 3,863,038 of Jan. 28, 1975 and other patents. Brakes of this class are used primarily in power transmission trains between hydraulic drive motors and gear speed reducers.

Customarily, the prior art disc brakes are biased by a spring means to the engaging or "on" condition and are released by the action of a hydraulically-operated piston which engages a stator disc to move it axially in opposition to the spring means so as to release the pressure between the rotor and stator discs of the assembly. While such prior art brakes differ considerably in mechanical configuration, insofar as is known, they all operate on the above-stated principle and are of the "single acting" type in terms of being released by the movement of the hydraulically-operated piston and engaged by the opposing spring means. That is to say, the prior art brakes have a rather sudden and direct on-off operational mode, which in most applications is an excessively sudden or abrupt brake action which does not impart a desirable soft "feel" to the system.

With the above problem in mind, it is the object of this invention to provide an improved disc brake which is double-acting in terms of its "on" and "off" mode of operation, and as a result the sudden, abrupt or jerky brake action of the prior art is totally eliminated and replaced by a smooth and soft action imparting an ideal operational "feel" to the brake system for the operator which is highly desirable in many application. In addition, this improved disc brake can be utilized as a "normally engaged" or as a "normally disengaged" brake.

More particularly, the invention employs coacting hydraulically operated brake releasing and brake applying movable pistons in separated fluid chambers of a disc brake housing. In an intervening dry chamber, the rotor and stator brake discs are arranged between the two pistons. The brake release piston has an axially extending annular skirt which surrounds the brake discs and has its far end engaging a brake pressure plate which constitutes one endmost stator disc of the brake assembly. The pressure plate is engaged on its side away from the brake release piston by springs which are intervened between the pressure plate and the brake applying piston. These springs bias the brake to an engaged condition and thus provide a fail-safe capability for the disc brake even when there is no normal operating pressure behind the brake applying piston. When the brake applying piston is pressurized or activated, such piston can override the force of the brake release piston and the springs to more positively and directly apply the disc brake.

The brake release piston is pressurized by normal machine operating pressure sufficient only to release the brake against spring action. The pressure on the release piston is easily overriden by the action of the engaging piston when the latter is pressurized by foot pedal or hand lever means under control of a machine operator who wishes to apply the brake.

Another significant feature of the invention lies in the provision of a threaded adjusting collar allowing the disc elements to be adjusted periodically to compensate for wear. The adjusting collar is lockable and is in a protected position within the housing of the brake but readily accessible at one end of the assembly.

Other features and advantages of the invention over the prior art will become apparent during the course of the following description.

BRIEF DESCRIPTION OF THE DRAWINGS

FIG. 2 is a longitudinal cross section taken on line 2—2 of FIG. 1.

DETAILED DESCRIPTION

Figure 1:
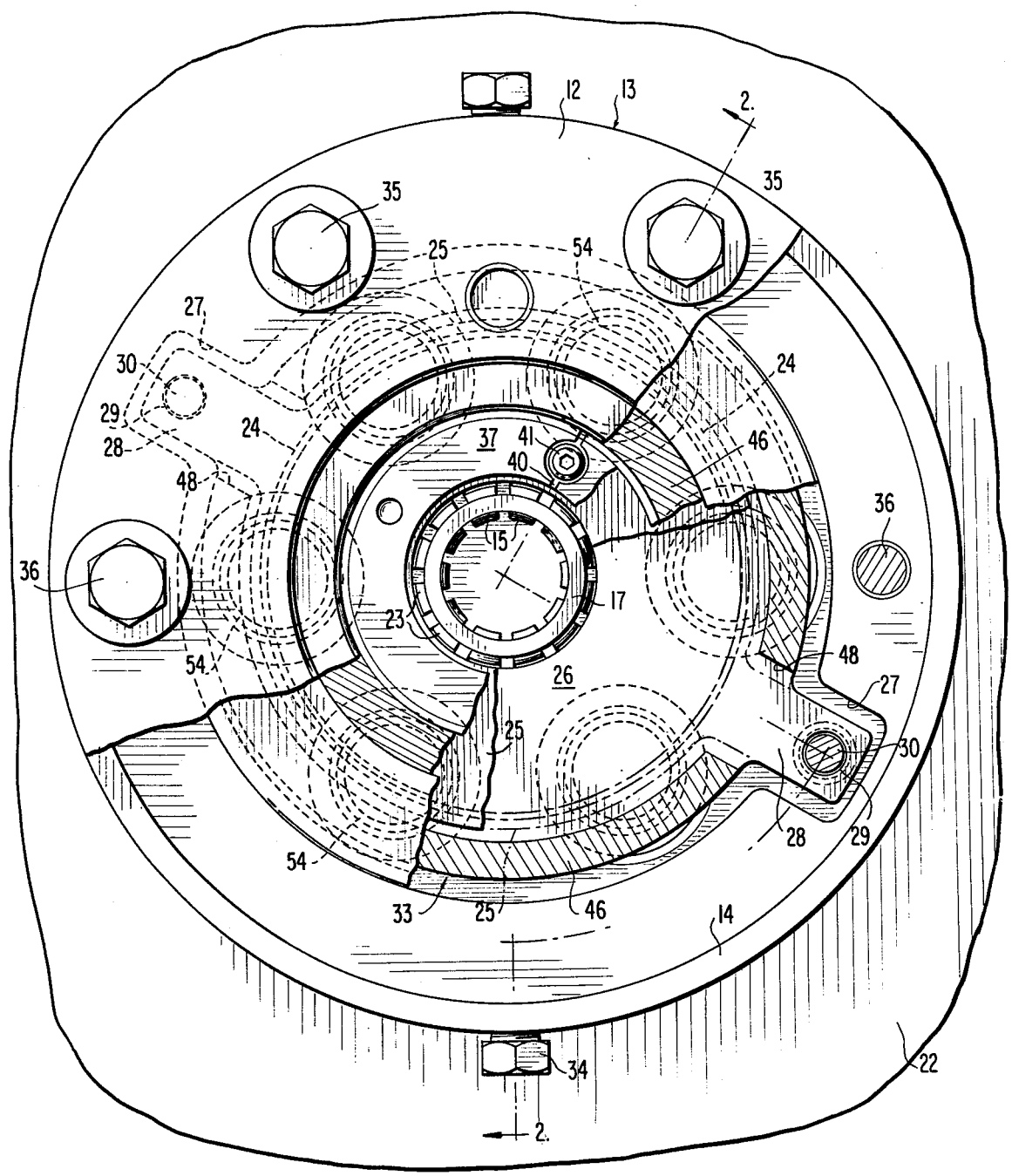
FIG. 1 is an end elevation, partly broken away and partly in section, of a disc brake embodying the invention.

Referring to the drawings in detail wherein like numerals designate like parts, the numeral 10 designates a hydraulic motor coupled as by screw means 11 with one section 12 of a disc brake housing 13 including a second housing section 14. The hydraulic motor 10 has a splined rotary output shaft 15 received within an internally splined coupling end portion 16 of a disc brake rotor shaft 17 journaled in a suitable bearing 18 on the housing section 14, a seal 19 being provided on the housing section 14 outwardly of the bearing 18. A splined end 20 of the rotor shaft 17 projects outside of the housing 13 and is coupled with an internally splined rotary input shaft 21 of a gear speed reducer, such as a planetary transmission, having a housing 22.

Between its ends, the rotor shaft 17 has additional splines 23 thereon coupled or keyed to internal splines of brake rotor discs 24, such as the three discs illustrated in the drawings. The number of rotor and stator discs employed in the brake assembly may be varied. In alternating relationship with the rotor discs 24 are a corresponding number of stator discs 25 plus a pressure plate 26 which, in effect, constitutes one additional stator disc in the assembly.

As shown in the drawings, the housing section 14 has cavities 27 at diametrically opposite points and these cavities receive radial anchoring tabs 28 of the stator discs 25 and pressure plate 26. The tabs 28 have apertures 29 formed therethrough receiving a pair of anchor pins 30 whose opposite ends are socketed into recesses 31 formed in the housing sections 12 and 14. The apertures 29 are loosely fitted over the pins 30 and the several stator discs and pressure plate 26 are maintained separated by light expansion springs 32, as shown. Thus it can be seen that the rotor discs 24 turn in the assembly with the splined shaft 17 while the stator discs 25 are anchored against turning by the pins 30 and associated elements.

The rotor and stator brake discs are disposed in a central chamber 33 of the housing which is dry and vented through a suitable vent plug 34 or like means. The cavities 27 form parts of the dry chamber 33 of the assembly.

The two housing sections 12 and 14 are secured in assembled relationship by screws 35 while additional long through bolts 36, not shown in FIG. 2, serve to couple the brake assembly to the transmission housing 22.

An important feature of the invention comprises the provision of a brake disc adjusting collar or sleeve 37 in surrounding relationship to one end portion of the rotor shaft 17 and having screw-threaded engagement in a threaded bore 38 of the housing section 12, the bore 38 opening through the outer end face of the housing section 12 to provide ready access to the adjusting collar 37. The interior end face 39 of collar 37 engages the first stator disc 25 whereby the stack of brake discs can be periodically adjusted to compensate for wear and the assembly can be initially adjusted to specifications during manufacturing. The adjusting collar 37 is divided at 40, FIG. 1, and is locked securely in selected adjusted positions by a threaded pipe plug 41 or equivalent means.

The brake assembly further comprises a brake release piston 42 operationally mounted in a first fluid pressure chamber 43 of the assembly, which chamber receives comparatively low pressure fluid through an inlet port 44. The pressure in the chamber 43 behind the brake release piston 42 is normal machine operating pressure which is of sufficient magnitude to release the brake as will be further described. The piston 42 is sealed to both circumferential walls of the pressure chamber 43 as by ring seals 45.

The brake release piston 42 has an integral axially extending annular skirt 46 extending therefrom and into the dry chamber 33 in surrounding spaced relationship to the discs 24 and 25. The end face 47 of the skirt 46 away from the body of the piston 42 bears against the pressure plate 26 whereby the latter may be shifted axially by the piston 42 under influence of pressure in the chamber 43 to release the brake. The skirt 46 is slotted at diametrically opposite points shown at 48 in FIG. 1 to straddle and clear the anchoring tabs 28 of the stator discs 25 so that the piston 42 can move with freedom over these discs.

The brake assembly additionally comprises a second pressurized fluid chamber 49 within the housing section 14 and on the far side of the dry chamber 33. A brake applying or engaging piston 50 having fluid seals 51 is operatively engaged in the chamber 49, which chamber receives pressurized fluid through a port 52 under control of a foot pedal or hand lever used by an operator. When activated by sufficient pressure, the piston 50 moves away from its seat 53 in housing section 14 and engages the pressure plate 26 to activate the disc brake by squeezing the several discs against the stationary end face 39 of collar 37. When the brake is thus engaged, the movement force on the piston 50 is sufficient to overcome the opposing pressure on the piston 42 in the chamber 43 and the piston 42 will yield and move slightly with the piston 50 to allow full engagement of the disc brake.

Additionally, a plurality of expansion springs 54 is arranged between the brake engaging piston 50 and the pressure plate 26. When the piston 50 is seated as in FIG. 2 and no pressure is applied in the chamber 43, the force of the springs 54 is sufficient to bias the brake to the engaged condition. In this manner, the springs 54 provide a completely fail-safe capability for the disc brake assembly which is not dependent on a piston or pistons remaining free or unjammed. In all cases where there is a loss of fluid pressure in the invention, the springs 54 will safely set the brake. When the disc brake is engaged during normal usage of a machine employing the invention, as by an operator using a brake foot pedal, the piston 50 will simply compress the springs 54 and move solidly against the pressure plate 26 to positively activate the brake.

The described arrangement provides a double-acting disc brake which differs from the single-acting brakes of the prior art in the sense that when the brake is engaged and released, the action is not a sudden and direct on-off operation tending to be abrupt or jerky. Instead, controlled pressure is applied in the chamber 49 which moves the piston 50 to compress the springs 54 so that the piston 50 can engage the pressure plate 26, followed by overcoming the operational pressure on the release piston 42 in chamber 43 to complete the brake engaging process. The action is very smooth and a very desirable "feel" is imparted to the system by the invention, as described.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. A disc brake comprising housing means, said housing means having a brake chamber and pressurized fluid chamber means, a rotor including rotor discs journaled on the housing means with the rotor discs disposed in said disc chamber, stator discs in the disc chamber in alternating relation to the rotor discs and being anchored to the housing means, a disc brake operating means in said pressurized fluid chamber means and responding to fluid pressure therein, and a brake disc adjusting means on said housing means and operable to selectively adjust said discs axially to compensate for wear and proper position and travel of said disc brake operating means, said brake disc adjusting means comprising an externally threaded sleeve having threaded engagement with the housing means and disposed in spaced surrounding relation to a portion of said rotor and having an end face adapted to bear against one endmost stator disc in the brake disc chamber, said threaded sleeve being split, and a tapered threaded plug connected with said split sleeve to expand the same laterally into locked engagement with the housing means.

* * * * *